Dec. 27, 1938.                P. E. GOOD                2,141,982
                              ROTARY MOTOR
          Original Filed April 16, 1935    8 Sheets-Sheet 1

Inventor
Paul E. Good
by his Attorneys
Howson & Howson

Dec. 27, 1938.  P. E. GOOD  2,141,982
ROTARY MOTOR
Original Filed April 16, 1935   8 Sheets-Sheet 2

Inventor:
Paul E. Good
by his Attorneys
Howson & Howson

Dec. 27, 1938.　　　P. E. GOOD　　　2,141,982
ROTARY MOTOR
Original Filed April 16, 1935　　8 Sheets-Sheet 3

Fig. 7.

Inventor:-
Paul E. Good
by his Attorneys
Howson & Howson

Dec. 27, 1938.   P. E. GOOD   2,141,982
ROTARY MOTOR
Original Filed April 16, 1935   8 Sheets-Sheet 4

Inventor:
Paul E. Good
by his Attorneys
Howson & Howson

Dec. 27, 1938.　　　　P. E. GOOD　　　　2,141,982
ROTARY MOTOR
Original Filed April 16, 1935　　8 Sheets-Sheet 5

Inventor:-
Paul E. Good
by his Attorneys
Howson & Howson

Dec. 27, 1938.   P. E. GOOD   2,141,982
ROTARY MOTOR
Original Filed April 16, 1935   8 Sheets-Sheet 6

Inventor:—
Paul E. Good
by his Attorneys
Howson & Howson

Dec. 27, 1938.  P. E. GOOD  2,141,982
ROTARY MOTOR
Original Filed April 16, 1935   8 Sheets—Sheet 8

Inventor:
Paul E. Good
by his Attorneys
Howson & Howson

Patented Dec. 27, 1938

2,141,982

UNITED STATES PATENT OFFICE 2,141,982

ROTARY MOTOR

Paul E. Good, Riverton, N. J.

Application April 16, 1935, Serial No. 16,719
Renewed May 21, 1938

23 Claims. (Cl. 121—67)

This invention relates to fluid impelled rotary motors and more particularly to the production of a small high speed motor of the type employed in operation of tube cleaners and the like in which the motive fluid is employed expansively.

Important objects of the present invention are the modification of the type of motor illustrated in the patent to J. H. Watson, granted February 21, 1911, No. 984,983 for Rotary engine, to enable the piston elements to be compactly arranged, to employ the gyroscopic forces engendered in operation for the purpose of offsetting the centrifugal forces and for offsetting the tendency to twist on the part of the piston elements as a result of the pressure of fluid applied thereto and to further so arrange the piston elements that frictional forces set up by rotation and as a result of pressure are, in a large measure, offset by mutual coaction of the piston elements themselves.

These and other objects I attain by the construction shown in the accompanying drawings wherein, for the purpose of illustration, I have shown a preferred embodiment of my invention and wherein:

Figures 1, 6:
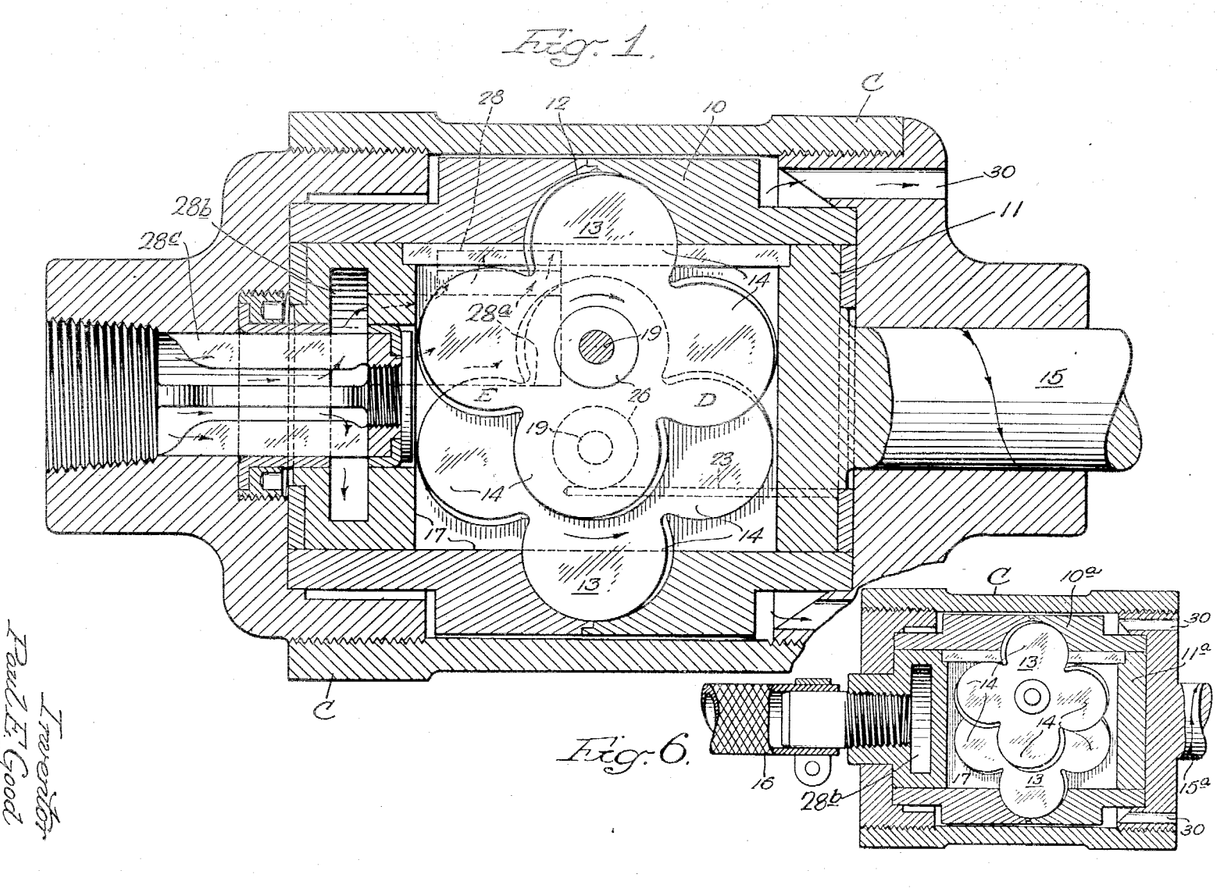
Fig. 1 is an enlarged longitudinal sectional view through a tube cleaner motor constructed in accordance with my invention.
Fig. 6 shows a modification of the structure of Fig. 1, in which the outer casing forms the rotor.

Referring now to the drawings, and more particularly Figs. 1 to 6 thereof, the numerals 10 and 11 indicate relatively rotatable members which are concentric and have a rotating fit with one another. The members 10 and 11 are preferably enclosed within a suitable casing C. The outer member 10, which may, as will hereinafter more fully appear, comprise either a rotor or a stator, and in Figs. 1 to 5 comprises a stator, has a circumferential series of spiral grooves 12 formed therein, while the inner member 11 mounts a pair of rotatable piston elements 13 having lobes 14 to fit and block the grooves as the pistons and members are rotated. The lobes 14 of the pistons may assume a variety of forms, and the grooves of the member 10 will be correspondingly shaped, the grooves in any instance comprising the geometric figure described by a lobe projecting from the inner member when the inner and outer members and the pistons are rotated at constantly proportional speeds. In Figs. 1 to 6 and 16 the lobes are circular in form while in the remaining figures the lobes are shaped like gear teeth, these forms being generally preferred due to the ease of production. In Figs. 1 to 5, the outer member 10 comprises the stator and the inner member 11 a rotor to which the drive shaft 15 for cleaning tools or the like is secured. In Fig. 6 the inner member 11a comprises the stator, being secured to the fluid pressure supply hose 16, and the outer member 10a comprises the rotor and has the tool shaft 15a attached thereto.

The piston elements 13 are disposed within a diametral slot 17 and have corresponding faces thereof in overlapping sliding relation to one another, the extent of overlap employed varying with the relative diameters of the piston elements and of the inner member 11. The construction shown in Figs. 1 to 5 employs piston elements having a diameter across opposed lobes slightly greater than the actual diameter of the rotor, thus enabling the use of lobes and grooves of considerable size. Since, however, it is desirable that the piston elements should be capable of being housed within the confines of the slot, the mean over-all width of the piston elements is, accordingly, less than the diameter of the member 11.

Where the inner member is the rotor and the piston elements are shaped like gear teeth or some close approximation thereof, there is no necessity for anchoring these piston elements in position in the grooves, as centrifugal force will tend to urge the piston elements outwardly and the form of the piston elements will prevent any tendency to axial displacement thereof. Under such circumstances, it is possible to employ simply a spring-pressed button 18 (Fig. 8) or similar expedient for exerting a slight frictional contact with the walls of the groove to hold the piston element in position when the rotor is at rest.

Figures 2, 3, 4, 5:
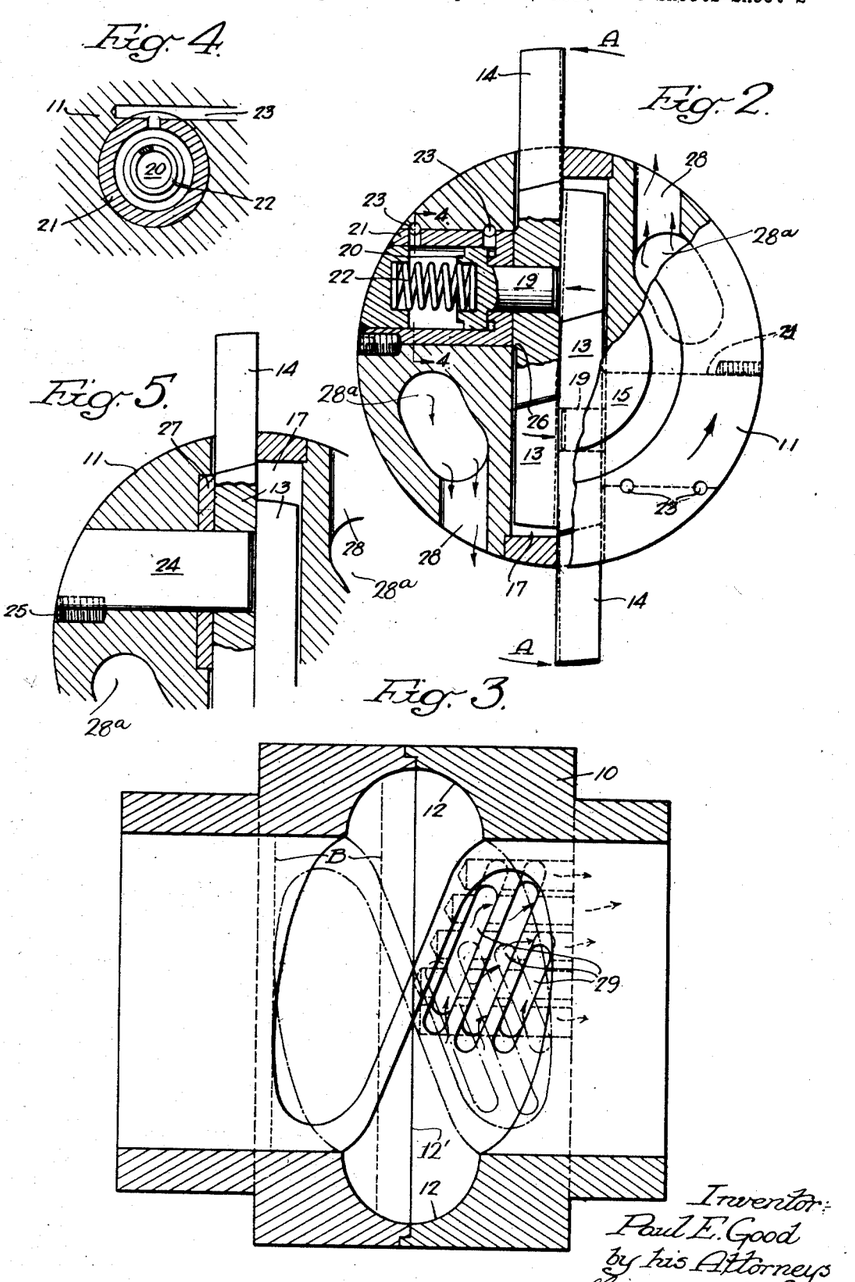
Fig. 2 is an end elevation partially broken away of the rotor of Fig. 1.
Fig. 3 is a sectional view through the stator of Fig. 1, the construction lines indicating the continuation of the grooves and the dotted lines B the path of movement of the inlet port.
Fig. 4 is a section on line 4—4 of Fig. 2.
Fig. 5 is a fragmentary sectional view showing an alternative form of pin mounting.

When, however, the piston lobes are of circular form, it is obviously possible for any given piston lobe to rotate in its groove and under these circumstances some means for definitely locating the axes of the piston elements is desirable. Such means may take a variety of forms, two forms being herein illustrated in Figs. 2, 4 and 5. In Figs. 2 and 4, the pistons are illustrated as mounted upon pins 19 which pins comprise the stems of pistons 20 mounted in cylinders 21 and normally spring-urged inwardly by springs 22 to a position where these pins will engage within axial openings formed in the pistons. The opposite ends of the cylinders are placed in communication with one end of the inner member 11 through ports 23, through which fluid pressure may be introduced to withdraw or seat the pin. Preferably, the fluid pressure utilized is in the form of a heavy lubricant introduced by means of a grease gun or the like.

In Fig. 5, the piston mountings comprise simple pins 24 inserted through the wall of the member 11 and suitably locked in position as indicated at 25.

In any event, the mounting pins fit loosely, comprising not so much a bearing for the piston element as a locating element therefor. In order that the piston element may be spaced from a slot wall which it opposes, spacing means are provided which may either consist of a hub enlargement as at 26 in Fig. 2 or an inserted wear plate as at 27 in Fig. 5. From an inspection of Fig. 2, in which the arrows A indicate the direction of the application of pressure against the pistons, it will be obvious that with a loose locating pin there will be tendency of the piston elements to rock upon these spacing elements 26 or 27 so that the inner portions of the piston elements will tend to bear forcibly against one another. While these piston elements are shown in solid lines as flatly engaging one another, it will be obvious that since the piston elements rotate fairly rapidly and are in pressure engagement with one another even though the piston elements be initially constructed so that they will flatly engage after a short period of operation, those portions of the faces where more rapid contact or relative movement occurs will become worn so that the faces no longer remain in contact. At this time the piston elements of the type shown in Fig. 2 will have a form shown somewhat exaggeratedly in dotted lines in Fig. 2, actual contact by the piston elements taking place at a point midway between the axes of these elements where the speed of rotation of the frictionally engaged faces is substantially uniform and these faces are moving in the same direction.

Figure 8:
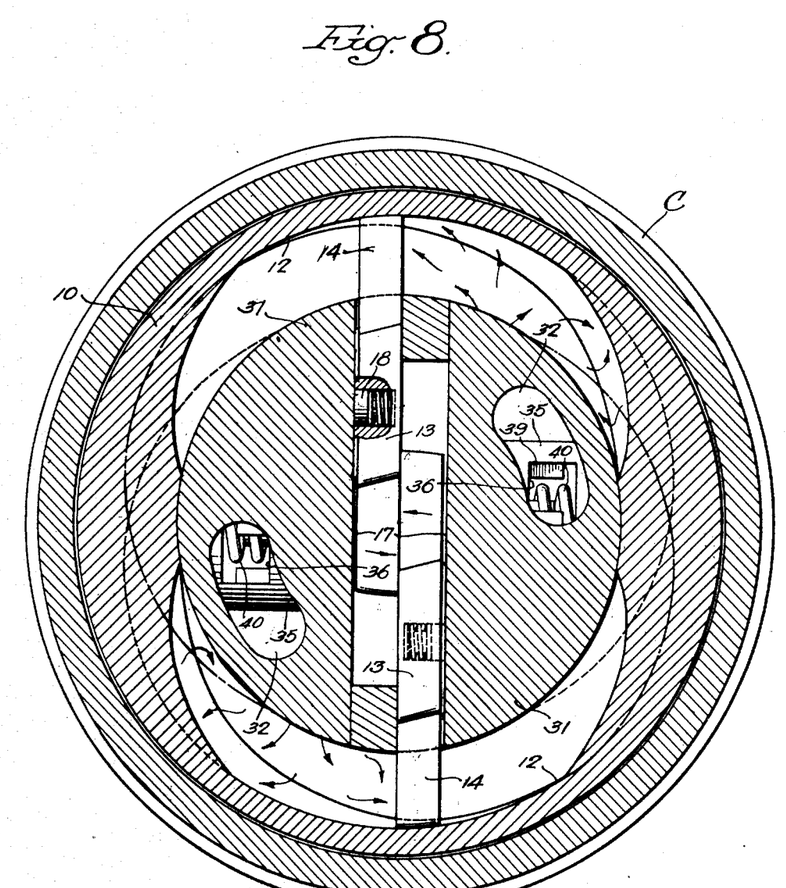
Fig. 8 is a section on line 8—8 of Fig. 7.
Figure 9:
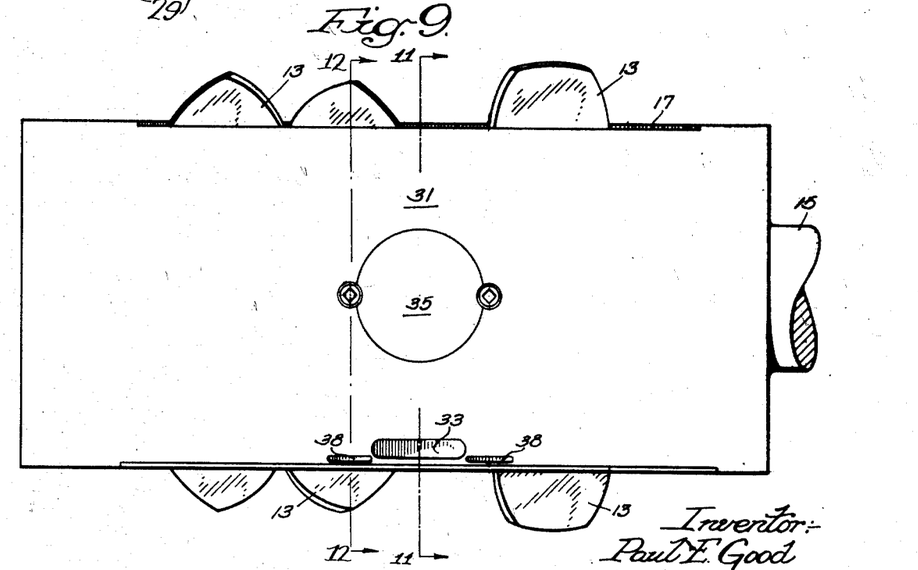
Fig. 9 is a side elevation of the rotor of Fig. 7.
Figure 10:
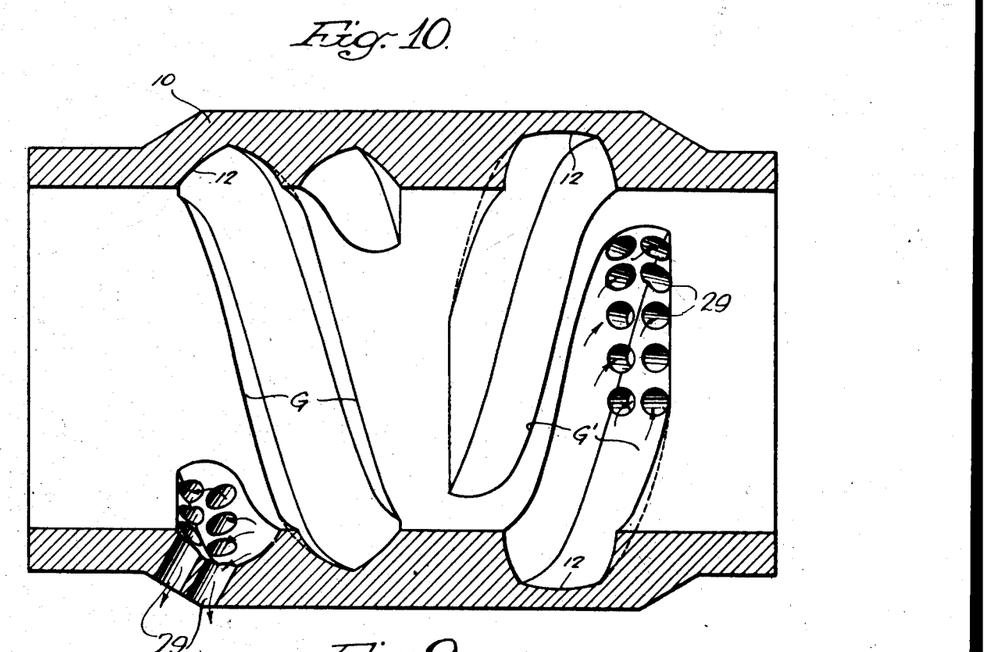
Fig. 10 is a sectional view through the stator of Fig. 7.
Figure 11:
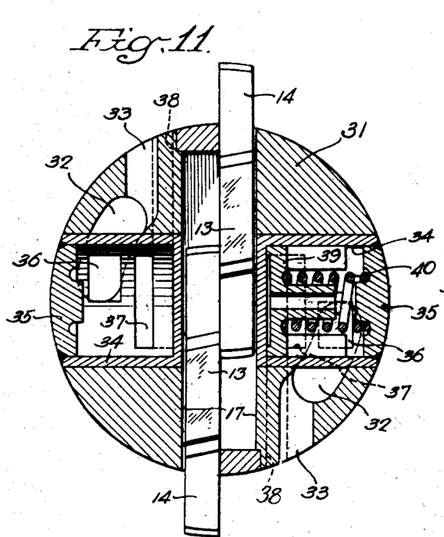
Figs. 11 and 12 are sections on lines 11—11 and 12—12 of Fig. 9.
Figure 12:
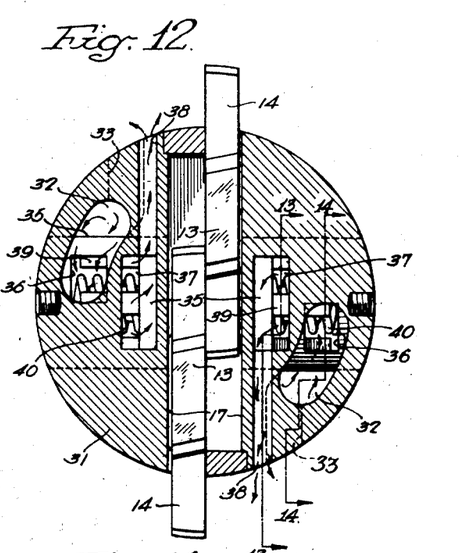
Figure 13:
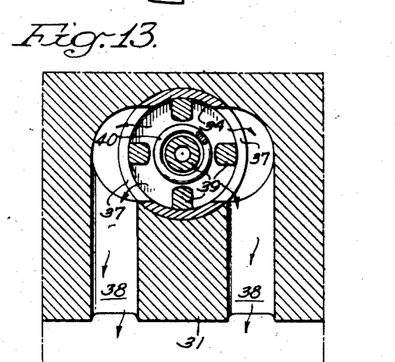
Figs. 13 and 14 are sections on lines 13—13 and 14—14 of Fig. 12.
Figure 14:
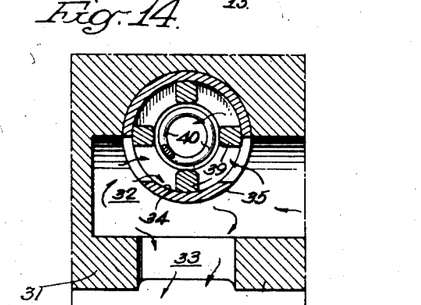

In the form of construction shown in Fig. 8, the contacting areas of the piston elements are all either in the zone of uniform speed or closely approximate this zone. In such a construction there is obviously little frictional contact between the elements and there is, consequently, little wear as a result of their contact with one another, while in the construction of Fig. 2 the same conditions obtain after a short period of operation. Obviously, the piston elements of Fig. 2 could be relieved as indicated by the dotted lines so that in initial operation this result would be obtained.

Intake port means are provided which comprise a port opening 28 formed in the inner member 11. This intake port is so disposed that it traverses a circumferential band of the outer member including those ends of the grooves first engaged by the lobes of the piston elements, the band being indicated by a dotted line path B on Fig. 3 of the drawings. When, by relative rotation of the members and the spiral arrangement of the grooves, the port 28 is axially displaced so that it no longer coincides with the grooves, the intake is cut off and subsequent propulsion to cause relative rotation of the members results solely from expansion of the fluid medium which, after it is fully expanded, passes through exhaust port means 29 communicating with the trailing ends of the grooves, or those ends thereof which are last engaged by a given lobe of the piston. As shown in the drawings, this exhaust port means communicates with openings 30 in the casing C preferably escaping at that end of the casing through which the tool shaft 15 or 15a projects.

The supply to the intake port 28 is at present disclosed as comprising a longitudinally-extending channel 28a communicating at one end with a cavity 28b formed in the end of the rotor and to which fluid pressure is delivered. In Figure 1 the delivery means to the cavity comprises a skeletonic gudgeon 28c carried by the adjacent end head of the casing C. This structure may, however, be omitted as disclosed in Figures 6 and 16, and communication with the supply conduit established through a direct port.

Figure 7:
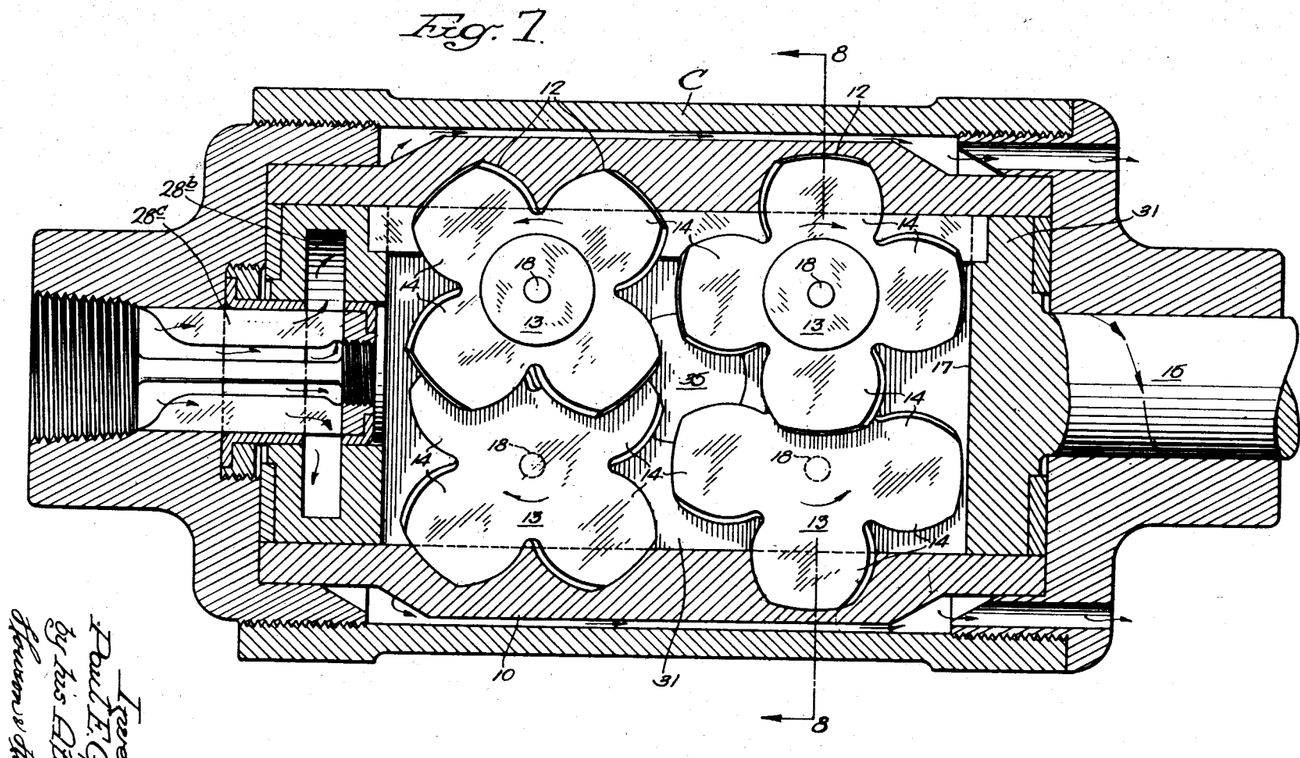
Fig. 7 is a modified construction employing two sets of pistons.

It will be obvious that the greatest pressure exerted by the admitted fluid against the piston elements will be exerted during the admission period; that is to say, when the piston elements are in the position of the left-hand group of pistons illustrated in Fig. 7, for at this time the lobe which is first engaging the groove has the head pressure of the air applied thereto while that which is about to leave the groove has only expansion pressure applied thereto. This unbalance in pressures has a tendency to rotate the piston about an axis perpendicular to the axis of the piston so that the piston elements would tend to more forcibly engage one another at the point of initial contact thereof which is indicated by D in Fig. 1, the direction of rotation of the piston elements being indicated by the arrows of that figure.

However, a second force, gyroscopic force, overcomes this tendency to a great extent. As is well known to those familiar with the art, any attempt to displace the axis of a rotating member in a given direction sets up forces operating at right angles to the applied force, tending to displace the axis in a second direction. In the present instance, due to the direction of attempted displacement (by rotation of the rotor) and to the direction of rotation of the piston elements, these gyroscopic forces tend to move the piston elements oppositely to one another and oppositely to the excess forces applied by the admission of fluid, thus setting up a tendency of the piston elements to most forcibly engage one another in the area where the lobes of the piston elements separate, which is indicated at E in Fig. 1. Thus, a force, which would be detrimental in operation, and a condition arising in operation which would likewise be detrimental, are employed to offset one another by the simple expedient of placing the piston elements in overlapping contacting relation. Furthermore, even though these piston elements be separated by an intervening plate, forces set up in this manner which would tend to cause bodily twist in the structure will still serve to offset one another so that the tool, as a whole, may be conveniently manipulated and be freed from excessive internal strains. Attention is directed to the fact that by properly forming the grooves, the direction of rotation may be made such that the gyroscopic forces may be made to overcome the centrifugal effort of the blades and to substantially balance the same so that frictional engagement between the lobes and the groove walls is materially reduced. In Figure 1, as has been set forth, the gyroscopic effort causes the lobes of the piston to pinch against one another at E. Assuming that the gyroscopic force is more than sufficient to overcome the pressure of the incoming fluid against the lobes of the piston, and the tendency to twist the piston from this source thus eliminated, the pinching of the pistons against one another at E will cause a tendency of the pistons to swing about the point E as a pivot so that the engaged lobes of the piston will tend to separate from the walls of the groove. This will not, however, take place due to the fact that centrifugal effort tends to move the pistons outwardly. By giving the piston the proper weight, the device when operated at a given speed will be substantially frictionless in its co-action between the pistons and groove walls.

In the form of invention shown in Figs. 7 to 15 inclusive, I have shown the preferred arrangement employed with my invention where power requirements and space necessitate the use of more than one set of grooves and a corresponding number of groups of piston elements. In these figures, two sets of grooves and two sets of piston elements are employed and it will be noted that the grooves of the groups are oppositely spiraled with the result that the piston elements at corresponding sides of the inner member 31 will rotate in opposite directions to one another as indicated by the arrows. Therefore, forces set up by unbalanced fluid pressures on the piston elements and by gyroscopic effects will be completely balanced insofar as their effect upon the instrument as a whole is concerned. It will also be noted by an inspection of Fig. 10 and of the diagram forming Fig. 15 that the grooves of one series are staggered with relation to the grooves of the other so that the power exerted is very evenly distributed. In the diagram, F, F' indicate the fluid admission port bands of the groove groups G, G' respectively, and with the direction of movement of the pistons relative to the grooves as indicated by the arrow in Figure 10, admission has just started in the grooves of group G while in the grooves of group G' admission has substantially been completed. With further multiplication of the numbers of groups of grooves and associated pistons, it will, of course, be possible to secure substantially uniform power application.

These figures further illustrate the application of a governor for controlling fluid admission to the grooves or, more strictly speaking, for controlling the width of the admission band through which admission occurs to the grooves. In these figures the numeral 32 designates fluid admission channels formed in the inner member 31 and opening through the wall of the member adjacent the projecting ends of each group of rotor elements through ports 33. Ports 33 are centrally located as regards the groove groups G and G' and are of such width that the circumferential band traversed thereby laps the groove groups through a distance H, Fig. 15. Formed in each side of the body of the inner member is a cylinder 34 at present shown as provided in the body by inserting a suitable cylindrical casing 35. The walls of these cylinders have formed therein ports 36 and 37, the ports 36 communicating with the respective passages 32 and being located toward the outer ends of the cylinders while the ports 37 communicate through ports 38 with the outer surface of the member 31 adjacent the respective associated piston elements. Two sets of ports 37 and 38 are provided for each cylinder and the ports 38 are axially displaced from the associated port 33 lying on opposite sides thereof, as may be very readily determined by comparing Figs. 13 and 14.

Figure 15:
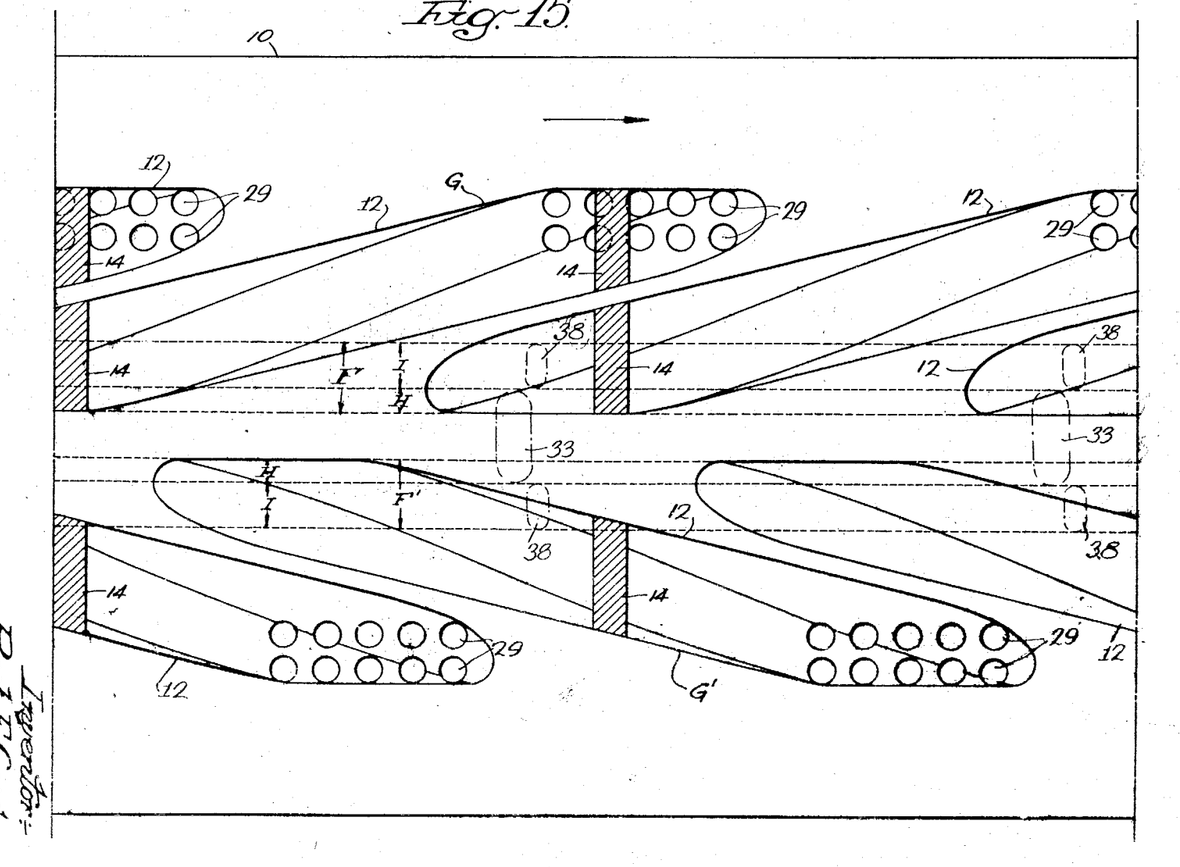
Fig. 15 is a development illustrating the stator and piston action in the construction shown in Figs. 7 to 14 inclusive.

Ports 38 traverse a circumferential band of the groove groups represented by the distance I in Fig 15, thus increasing the effective intake area to the width of the band F. Within each cylinder 34 is a combined governor weight and valve 39, this element being normally maintained at the inner end of the cylinder by a directly contacting coil spring 40. The element is suitably balanced for fluid pressures as indicated and upon outward movement will close the ports 37 to an extent dependent upon the position of the element 39 which is, in turn, dependent upon the centrifugal force generated in operation. If the speed becomes excessive, ports 37 are completely cut off so that only the ports 33 are effective in operation. Particular attention is directed to the fact that the mechanism just described provides a governor mechanism in a structure of this character which is completely free of pivot pins or link connections. This is extremely important as it will be at once obvious that a device of this character constructed for use in, for example, a 1½" tube will have parts of such small size that any linkage or pin connections would mean provision in the structure of elements which would become inoperative after a very short period of operation. Elimination of such elements can only be had through direct contact of the governor spring with the combined weight and valve.

Figure 16:
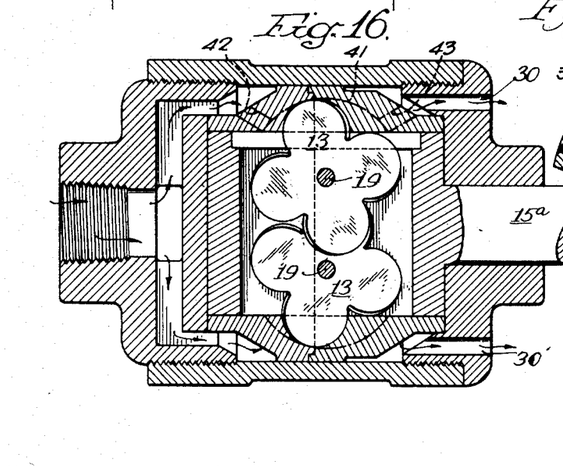
Fig. 16 illustrates a modification of the structure of Fig. 1 to enable use of the device with incompressible fluids.
Figure 17:
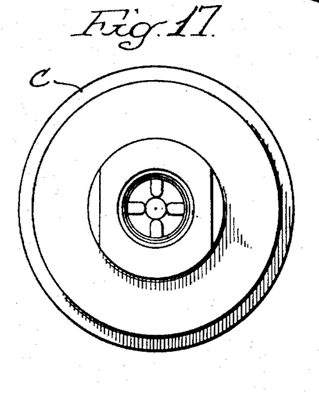
Figs. 17 and 18 are characteristic front and rear end elevations of the structures shown in Figs. 1 to 15 inclusive.
Figure 18:
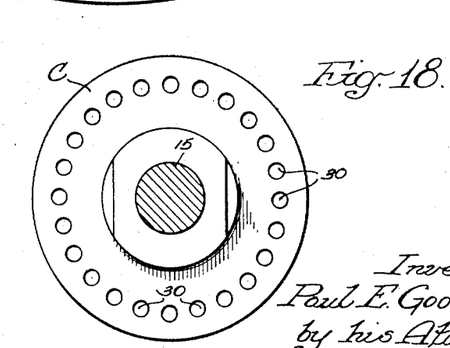

In Fig. 16 I have illustrated a form of construction suitable for use with compressible or incompressible fluids. In such a construction it is manifestly possible to form both the intake ports and exhaust ports in permanent communication with the grooves 41 as indicated at 42 and 43 respectively.

Figure 19:
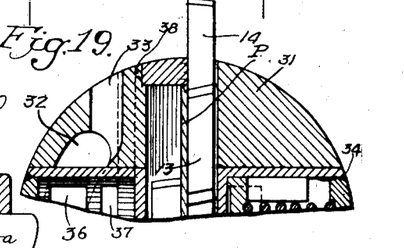
Fig. 19 is a detail sectional view illustrating a modified mounting of the pistons.

While I have hereinbefore referred to the pistons as operating in direct contact with one another, it is obviously possible to employ a partition P therebetween, as suggested in Fig. 19; this partition may either be stationary or float in the cavity, as desired.

Figure 20:
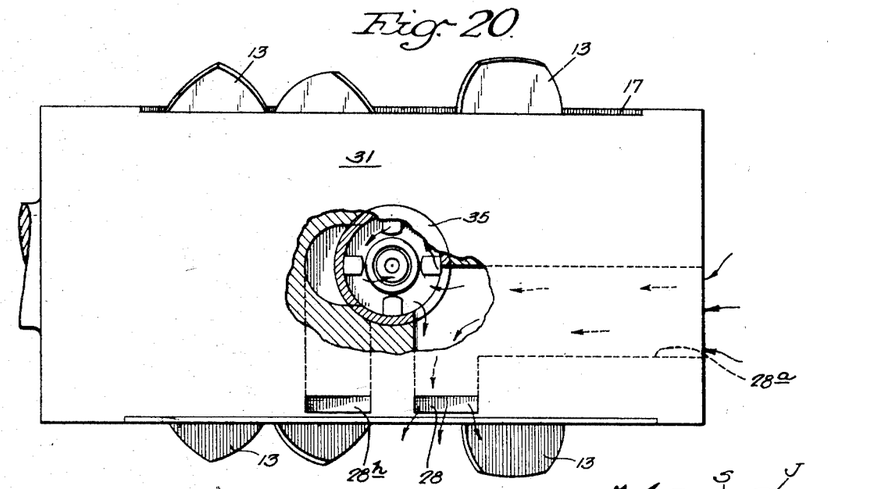
Fig. 20 is an elevation of a modified form of rotor.
Figures 21, 22:
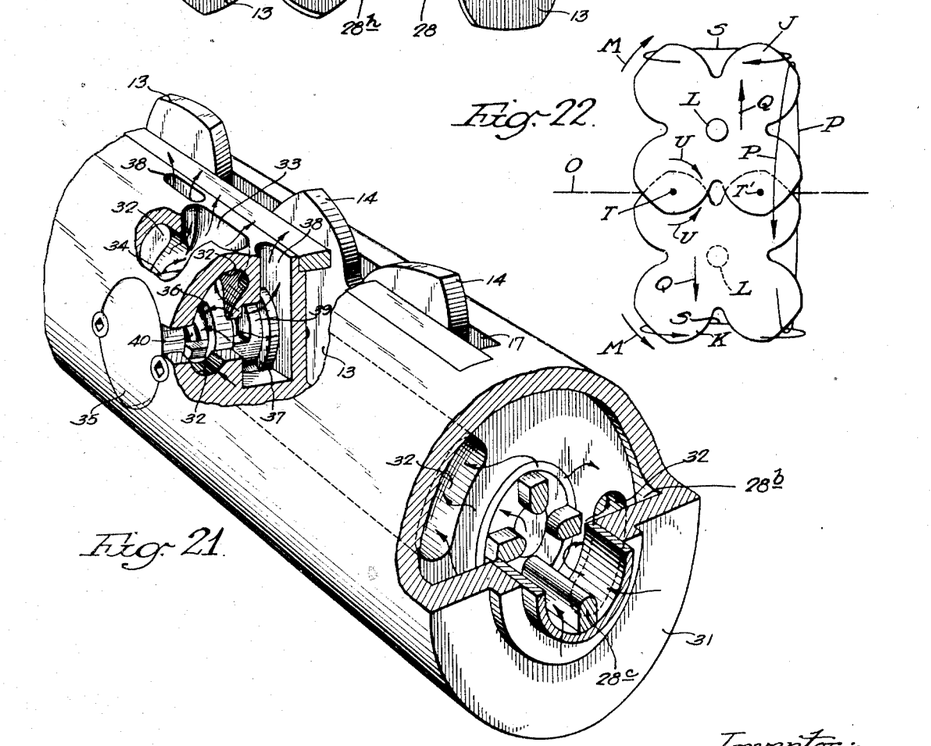
Fig. 21 is a fragmentary perspective view partially broken away showing the fluid pressure delivery system and controls of a structure such as shown in Fig. 9.
Fig. 22 is a diagrammatic view illustrating the operation of centrifugal and gyroscopic forces in motors constructed in accordance with my invention.

In Fig. 20 I have illustrated a modified construction in which two sets of pistons are employed, to one of which fluid pressure is constantly supplied and the other of which has its supply ports controlled by a governor which closes at high speeds. This arrangement accomplishes the same result as the governor construction hereinbefore described, but has the additional advantage of providing ample reserve power and yet permitting a minimum use of fluid pressure in normal operation.

Since the constructions herein described are obviously capable of considerable modification and may, obviously, be employed in pumps without in any manner departing from the spirit of my invention, I do not wish to be understood as limiting myself thereto except as hereinafter claimed.

I claim:

1. In a rotary motor or the like, a cylinder provided on its inner surface with a circumferential series of spiral groves, a rotor in said cylinder, rotatable piston elements carried by the rotor and having lobes meshing with said grooves, the rotor having a slot in which the body portions of said piston elements are disposed, the inner portions of said piston elements being in confronting overlapping relation, said grooves being generated by the lobes of the piston elements when the piston elements are positioned to intersect the stator and the piston elements and rotor are rotated at constantly proportional speeds whereby the lobes of the piston elements block said grooves from end to end during rotation of the rotor.

2. In a rotary motor or the like, a cylinder provided on its inner surface with a circumferential series of spiral grooves, a rotor in said cylinder, rotatable piston elements carried by the rotor and having lobes meshing wth said grooves, the rotor having a slot in which the body portions of said piston elements are disposed, the inner portions of said piston elements being in confronting overlapping relation and having sliding engagement with one another, said grooves being generated by the lobes of the piston elements when the piston elements are positioned to intersect the stator and the piston elements and rotor are rotated at constantly proportional speeds whereby the lobes of the piston elements block said grooves from end to end during rotation of the rotor.

3. In a rotary motor or the like, a cylinder provided on its inner surface with a circumferential series of spiral grooves, a rotor in said cylinder, rotatable piston elements carried by the rotor and having lobes meshing with said grooves, and blocking said grooves from end to end thereof during their movement therethrough the rotor having a slot in which the body portions of said piston elements are disposed, the inner portions of said piston elements being in confronting overlapping relation, and having sliding engagement with one another, the mutual contact pressure region occurring between the axes of rotation of said piston elements.

4. In a rotary motor, a stator having a circumferential series of spiral grooves in the wall thereof, a rotor fitting the stator and having a rotatable lobed piston element, the lobes of which coact with said grooves to block the same, a supply port in the rotor traversing a circumferential band of the stator including those ends of the grooves first engaged by the lobes of said piston element, a second supply port traversing a second band including the intermediate portions of said grooves, a valve controlling said second port and movable radially of the rotor under the influence of centrifugal force to close said second port and a spring opposing movement of said valve under the influence of centrifugal force and directly engaging the valve.

5. In a rotary motor, a stator having two circumferential series of spiral grooves arranged in parallel bands, the grooves of said series being oppositely spiraled, a rotor fitting the stator and having two groups of rotatable lobed piston elements the lobes of which coact with said grooves to block the same, a supply port in the rotor traversing a circumferential band of the stator including those ends of the grooves of both series first engaged by the lobes of the associated piston elements, other supply ports in said rotor and each traversing a band of one of said groove series immediately adjacent the band thereof traversed by the first-named port, a valve controlling said second-named ports and movable radially of the rotor under the influence of centrifugal force to close said second-named ports, a spring opposing movement of said valve under the influence of centrifugal force, and means to exhaust fluid from said grooves.

6. In a rotary motor, a stator having two circumferential series of spiral grooves arranged in parallel bands, the grooves of said series being oppositely spiraled, a rotor fitting the stator and having two groups of rotatable lobed piston elements, the lobes of which coact with said grooves to block the same, a supply port in the rotor traversing a circumferential band of the stator including those ends of the grooves of both groups first engaged by the lobes of the associated piston elements, other supply ports in said rotor and each traversing a band of one of said groove series immediately adjacent the band thereof traversed by the first-named port, a valve controlling said second-named ports and movable radially of the rotor under the influence of centrifugal force to close said second-named ports, a spring opposing movement of said valves under the influence of centrifugal force and directly engaging the valve, and means to exhaust fluid from said grooves.

7. In a rotary motor or the like, a stator having two circumferential series of spiral grooves arranged in parallel bands, the grooves of said series being oppositely spiraled, a rotor fitting the stator and having two groups of rotatable lobed piston elements, the lobes of which coact with said grooves to block the same, a supply port in the rotor traversing a circumferential band of the stator including those ends of the grooves of both series first engaged by the lobes of the associated piston elements and means to exhaust fluid from the grooves.

8. In a rotary motor or the like, a stator having two circumferential series of spiral grooves arranged in parallel bands, the grooves of said series being oppositely spiraled, a rotor fitting the stator and having two groups of rotatable lobed piston elements, the lobes of which coact with said grooves to block the same, a supply port in the rotor traversing a circumferential band of the stator including those ends of the grooves of both series first engaged by the lobes of the associated piston elements, the grooves of the series being staggered with relation to one another and means to exhaust fluid from the grooves.

9. In a rotary motor, a stator having two circumferential series of spiral grooves arranged in parallel bands, the grooves of said series being oppositely spiraled, a rotor fitting the stator and having two groups of rotatable lobe piston elements of which coact with said grooves to block the same, a supply port in the rotor traversing a circumferential band of the stator including those ends of the grooves of both series first engaged by the lobes of the associated piston elements, other supply ports in said rotor and each traversing a band of one of said groove series immediately adjacent the band thereof traversed by the first-named port, a valve controlling said second-named ports and movable radially of the rotor under the influence of centrifugal force to close said second-named ports and a spring opposing movement of said valve under the influence of centrifugal force, the grooves of the series being staggered with relation to one another and means to exhaust fluid from the grooves.

10. In a rotary motor or the like, a stator having two circumferential series of spiral grooves arranged in parallel bands, the grooves of said series being oppositely spiraled, a rotor fitting the stator and having two groups of rotatable lobe piston elements the lobes of which coact with said grooves to block the same, and a supply port in the rotor traversing a circumferential band of the stator including those ends of the grooves of both series first engaged by the lobes of the associated piston elements, the piston elements associated with each series of grooves being two in number and being disposed in overlapping engagement and means to exhaust fluid from the grooves.

11. In a rotary motor or the like, relatively rotatable elements, the outer element comprising a cylinder provided on its inner surface with a circumferential series of spiral grooves, means to introduce fluid pressure to said grooves and exhaust fluid pressure therefrom, the inner element fitting within the cylinder, rotatable pistons carried by said inner element and having lobes meshing with said grooves and blocking said grooves from end to end during their passage therethrough, the inner member having a slot in which the body portions of said pistons are disposed, the inner portions of said piston elements being in confronting overlapping relation, said piston elements rotating in opposite directions upon relative rotation of said inner and outer members.

12. In a rotary motor or the like, a cylinder provided on its inner surface with a circumferential series of spiral grooves, a rotor in said cylinder, rotatable piston elements carried by the rotor and having lobes meshing with said grooves and blocking said grooves from end to end during their passage therethrough, the rotor having a slot in which the body portions of said piston elements are disposed, the inner portions of said piston elements being in confronting overlapping relation, the piston elements rotating in opposite directions as the rotor is rotated, the direction of rotation of the rotor and pistons being such that gyroscopic effects induced by said piston elements counteract the centrifugal effort of the piston elements.

13. In a rotary motor or the like, a cylinder provided on its inner surface with a circumferential series of spiral grooves, a rotor in said cylinder, rotatable piston elements carried by the rotor and having lobes meshing with said grooves, the rotor having a slot in which the body portions of said piston elements are disposed, the inner portions of said piston elements being in confronting overlapping relation, pins upon which the piston elements are mounted, and fluid-pressure-operated means for withdrawing said pins.

14. In a rotary motor or the like, a cylinder provided on its inner surface with a circumferential series of spiral grooves, a rotor in said cylinder, rotatable piston elements carried by the rotor and having lobes meshing with said grooves and blocking said grooves from end to end during their passage therethrough, the rotor having a slot in which the body portions of said piston elements are disposed, the inner portions of said piston elements being in confronting overlapping relation, said cylinder being circumferentially divided at the substantial center of the series of grooves.

15. In a rotary motor or the like, a stator having two circumferential series of spiral grooves arranged in parallel bands, the grooves of said series being oppositely spiraled, a rotor fitting the stator and having two groups of rotatable lobed piston elements, the lobes of which coact with said grooves to block the same, and a supply port in the rotor traversing a circumferential band of the stator including those ends of the grooves of both series first engaged by the lobes of the associated piston elements, the pistons of each series being two in number and being arranged within a slot formed in the rotor, the inner portions of the pistons of each series being in overlapping relation to one another and means to exhaust fluid from said grooves.

16. In a rotary motor or the like, a stator having two circumferential series of spiral grooves arranged in parallel bands, the grooves of said series being oppositely spiraled, a rotor fitting the stator and having two groups of rotatable lobed piston elements, the lobes of which coact with said grooves to block the same, and a supply port in the rotor traversing a circumferential band of the stator including those ends of the grooves of both series first engaged by the lobes of the associated piston elements, the grooves of the series being staggered with relation to one another, the pistons of each series being two in number and being arranged within a slot formed in the rotor, the inner portions of the pistons of each series being in overlapping relation to one another and means to exhaust fluid from said grooves.

17. The construction set forth in claim 1 wherein the direction of rotation of the rotor and of the piston elements is such that gyroscopic effort of the elements is opposed to the torque engendered by fluid pressure against the pistons.

18. The construction set forth in claim 1 wherein the direction of rotation of the rotor and of the piston elements is such that gyroscopic effort of the elements is opposed to the torque engendered by fluid pressure against the pistons, and gyroscopic effort preponderates to an extent such that the pistons grip one another at the point of separation whereby the pistons tend to swing about the point of separation as a pivot and thereby reduce the centrifugal effort of the blades.

19. In a rotary motor, a stator having two circumferential series of spiral grooves arranged in parallel bands, the grooves of said series being oppositely spiraled, a rotor fitting the stator and having two groups of rotatable lobed piston elements, the lobes of which co-act with said grooves to block the same, a supply port in the rotor for each series of grooves and traversing a circumferential band of the stator including the ends of the grooves first engaged by the lobes of the piston elements, a governor closing one of said supply ports at a predetermined rotor speed and means to exhaust fluid from said grooves.

20. In a rotary motor or the like, a cylinder provided on its inner surface with a circumferential series of spiral grooves, a rotor in said cylinder, rotatable piston elements carried by the rotor and having lobes meshing with said grooves, the rotor having a slot in which the body portions of said piston elements are disposed, the inner portions of said piston elements being in confronting overlapping relation the piston elements having an extreme diameter greater than the diameter of the rotor and a mean diameter such that they may be completely confined within the slot of the rotor.

21. In a rotary motor, a stator having a circumferential series of spiral grooves formed therein, a rotor fitting the stator and having rotatable lobed piston elements the lobes of which co-act with said grooves to block the same, a supply port in the rotor traversing a circumferential band of the stator including those ends of the grooves first engaged by the lobes of the piston elements, a second supply port in said rotor traversing a band of said grooves immediately adjacent the band thereof traversed by the first-named port, a valve controlling said second-named port and movable under the influence of centrifugal force to close the second-named port and a spring opposing movement of said valve under the influence of centrifugal force and directly engaging the valve.

22. In a rotary motor, a stator having a circumferential series of spiral grooves formed therein, a rotor fitting the stator and having rotatable lobed piston elements the lobes of which co-act with said grooves to block the same, a supply port in the rotor traversing a circumferential band of the stator including the ends of the grooves first engaged by the lobes of the piston elements, a governor closing said supply port at a predetermined rotor speed, and means to exhaust fluid from said grooves.

23. In a rotary motor or the like, a cylinder provided on its inner surface with a circumferential series of spiral cavities, a rotor in said cylinder, rotatable piston elements carried by the rotor and having lobes meshing with said cavities, the rotor having a slot in which the body portions of said piston elements are disposed, the inner portions of said piston elements being in confronting overlapping relation, there being a partition between said piston elements, the direction of rotation of the piston elements and the direction of rotation of the rotor being such that the gyroscopic effort of the pistons causes binding opposing the centrifugal effort thereof.

PAUL E. GOOD.